United States Patent
Dijoud et al.

(10) Patent No.: US 8,156,727 B2
(45) Date of Patent: Apr. 17, 2012

(54) FAN NOZZLE OF ADJUSTABLE SECTION

(75) Inventors: Delphine Edith Dijoud, Paris (FR); Benoit Marc Michel Fauvelet, Bois le Roi (FR); Thomas Alain Christian Vincent, Palaiseau (FR)

(73) Assignee: SNECMA, Paris (FR)

( * ) Notice: Subject to any disclaimer, the term of this patent is extended or adjusted under 35 U.S.C. 154(b) by 754 days.

(21) Appl. No.: 12/275,729

(22) Filed: Nov. 21, 2008

(65) Prior Publication Data
US 2009/0133406 A1     May 28, 2009

(30) Foreign Application Priority Data
Nov. 23, 2007   (FR) ...................................... 07 59252

(51) Int. Cl.
*F02K 1/38*   (2006.01)
(52) U.S. Cl. ......................................... 60/262; 60/226.1
(58) Field of Classification Search ................. 60/226.1, 60/262, 264, 770, 771; 181/213, 220; 239/265.19, 239/265.43
See application file for complete search history.

(56) References Cited

U.S. PATENT DOCUMENTS

| | | | | |
|---|---|---|---|---|
| 6,718,752 | B2 * | 4/2004 | Nesbitt et al. | 60/204 |
| 7,085,388 | B2 * | 8/2006 | Butler et al. | 381/71.3 |
| 7,644,575 | B2 * | 1/2010 | Wood et al. | 60/204 |
| 7,966,826 | B2 * | 6/2011 | Alkislar et al. | 60/770 |
| 2002/0125340 | A1 | 9/2002 | Birch et al. | |
| 2005/0229585 | A1 * | 10/2005 | Webster | 60/226.1 |
| 2007/0207328 | A1 * | 9/2007 | Frost et al. | 428/469 |

FOREIGN PATENT DOCUMENTS

| | | |
|---|---|---|
| EP | 1 367 249 A1 | 12/2003 |
| EP | 1 612 416 A1 | 1/2006 |

\* cited by examiner

*Primary Examiner* — Louis Casaregola
*Assistant Examiner* — Phutthiwat Wongwian
(74) *Attorney, Agent, or Firm* — Oblon, Spivak, McClelland, Maier & Neustadt, L.L.P.

(57) ABSTRACT

An adjustable section nozzle having a ring of deformable panels arranged close to its trailing edge is disclosed. Each panel has a dual-strip type structure made up of two materials presenting different coefficients of expansion, together with controlled heater devices that are thermally coupled to the set of panels.

10 Claims, 2 Drawing Sheets

FAN NOZZLE OF ADJUSTABLE SECTION

The invention relates to a bypass turbojet, and more particularly relates to an improvement to a fan nozzle that enables the outlet section of said nozzle to be adapted as a function of operating conditions.

BACKGROUND OF THE INVENTION

It is known that the performance of a turbojet can be improved and/or that its noise level can be reduced by varying the flowsection for air from the fan as a function of flying conditions. Thus, compared with the section that is normally appropriate for cruising conditions, improved performance can be obtained during takeoff or landing by reducing said section. For this purpose, it is known to place a ring of flaps close to the trailing edge of the nozzle, the flaps being movable and being controlled so as to retract towards the axis of the turbojet, thereby reducing the flowsection for the air flowing through the fan. The flaps are generally actuated by actuators, thereby adding considerably to the weight of the mechanism.

Document US 2006/0101803 describes a nozzle in which the trailing edge is provided with deformable panels known as "chevrons" that include inner tendons of shape memory alloy and of curvature that is determined by temperature. The curvature imposed by the tendons (which depends on their temperature) is transmitted to the panels. The electrical control means are simpler and lighter in weight, but the structure of such a panel remains complex.

OBJECT AND SUMMARY OF THE INVENTION

The invention seeks to provide another type of deformable panel.

More particularly, the invention provides an adjustable-section fan nozzle having a ring of deformable panels arranged close to its trailing edge, wherein each panel is of dual-strip type structure being made of two materials presenting different coefficients of expansion, and wherein controlled heater means are thermally coupled to the set of panels.

More precisely, it is possible to use a lamellar structure made up of two materials presenting different coefficients of expansion in association with an electrical heater device.

In a presently-preferred embodiment, each panel comprises an inner strip of thermally-insulating material and at least one outer strip of metal. The two strips are assembled one against the other so that the difference in elongation (parallel to the axis of the nozzle) of the two strips, under the effect of a rise in temperature, causes the panel to curve in a direction tending to reduce the flowsection at the outlet from the nozzle.

The thermally-insulating material may be a composite material, e.g. based on carbon.

In one possible embodiment, the panels may be heated by a set of electrical resistances. These resistances are distributed over the surfaces of the metal strips (with dielectric insulation being interposed) and they are in thermal contact therewith. Thus, the panels are controlled simultaneously by injecting electric current into the array of resistances.

In one possible embodiment, each panel is substantially trapezoidal in shape. Thus, the panels curving under the effect of a temperature rise take up a configuration in which they are practically edge to edge, without overlap.

Advantageously, the panels are mounted in the thickness of an annular space defined in the wall of the nozzle so they do not disturb the flow of the stream of air under cruising conditions. More particularly, the panels may be situated in continuity with the inner aerodynamic surface of the nozzle when the controlled heater means are not in operation.

The invention also provides a bypass turbojet fitted with a fan nozzle as defined above.

BRIEF DESCRIPTION OF THE DRAWINGS

The invention and other advantages thereof appear more clearly in the light of the following description of a possible embodiment of an adjustable-section fan nozzle based on the invention, given purely by way of example and made with reference to the accompanying drawings, in which.

MORE DETAILED DESCRIPTION

Figure 1:
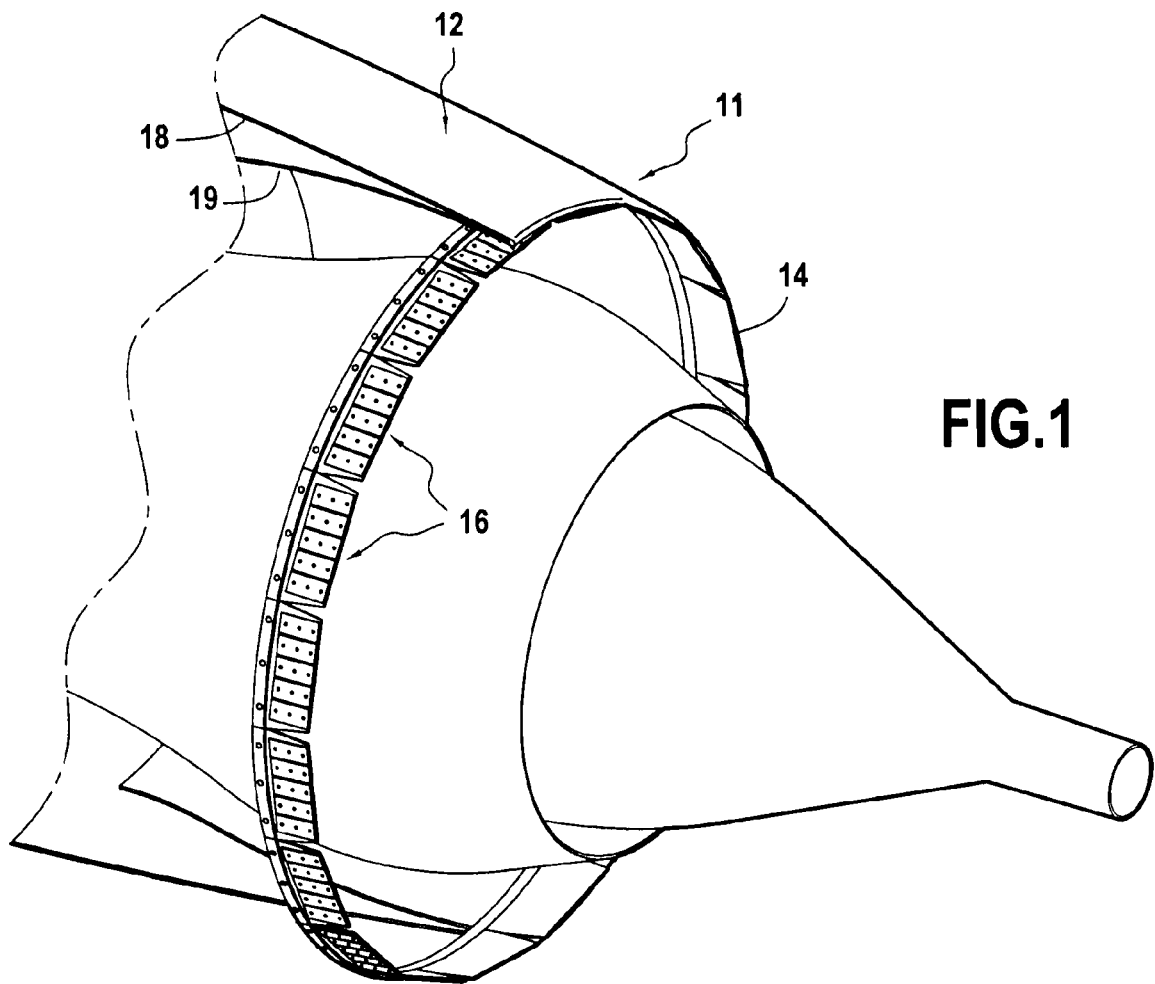
FIG. 1 is a cutaway fragmentary perspective view showing the rear of a fan nozzle in accordance with the invention.

FIG. 1 shows the rear portion of the nacelle 11 of a bypass turbojet, and in particular it shows the structure of the annular nozzle 12 of the fan. The nozzle presents a trailing edge 14 having deformable panels 16 arranged in a ring in the vicinity of the edge thereof. The outer wall of the fan nozzle is made up of two annular casings 18 and 19 that join at the rear, forming an annular cavity 21 (see FIG. 3) in which the deformable panels 16 are housed.

Figure 2:
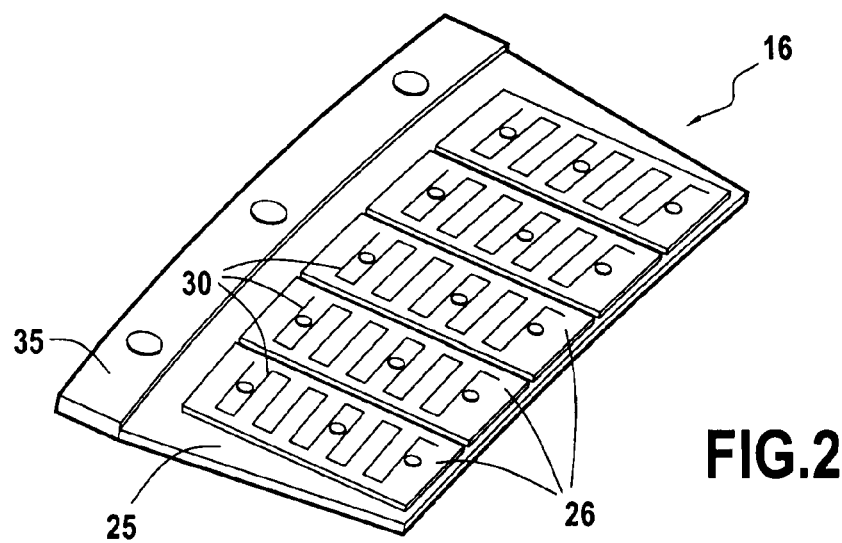
FIG. 2 is a diagrammatic perspective view of a deformable panel.
Figure 3:
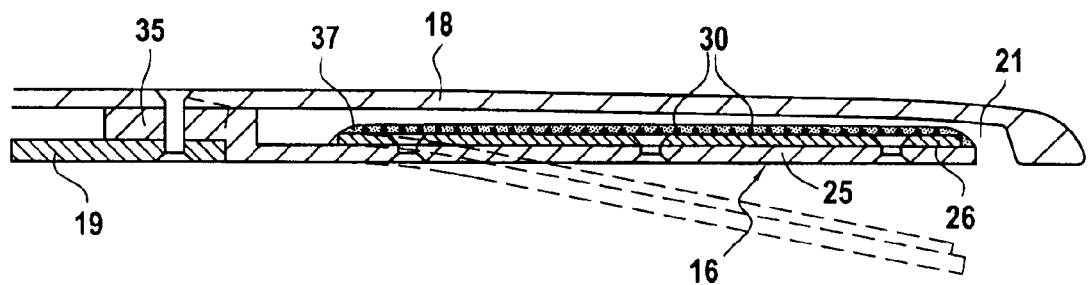
FIG. 3 is a section view of the panel shown in position in a cavity of the nozzle wall.

According to an important characteristic of the invention, each panel 16 presents a structure of the dual-strip type, being made up of two materials having two different coefficients of expansion. For each panel 16, there can be seen an inner strip 25 of thermally-insulating material having a low coefficient of expansion and at least one outer metal strip 26. The strip 25 may be made of a composite material, e.g. a material based on carbon. The strips are assembled one against the other by adhesive and/or by riveting. Adhesive could be replaced by conventional carbon/metal brazing. More precisely, each panel advantageously includes a plurality of metal strips 26 associated with a common strip of thermally-insulating material. The metal strips 26 are disposed side by side at small circumferential spacing, the strip 25 of thermally-insulating material acting as a common support for them. As shown in FIG. 2, the metal strips are specifically riveted to the strip of thermally-insulating material having a low coefficient of expansion. In this way, the expansion of the metal strip has no effect in the circumferential direction. In contrast, in the axial direction, the expansion of the metal strip, which is greater than the expansion of the strip of thermally-insulating material, causes the panel to become curved and to penetrate into the flowsection by moving out from the annular cavity 21. The panels are disposed continuously with the internal aerodynamic surface when the control heater means are not activated, as shown in FIG. 3.

Each panel is substantially trapezoidal in shape. Thus, when the panels retract so as to engage into the flowsection for the air stream from the fan, they "reconstitute" a shroud of said nozzle by becoming practically edge to edge, but without overlap or abutment.

In addition, the control heater means are thermally coupled to the set of panels. More particularly in this example, the heater means comprise electrical resistances 30 that are distributed over the (outside) surfaces of the metal strips 26 and they are in thermal contact therewith, via a thin layer of dielectric insulation. These electrical resistances may be in the form of resistive deposits, in the form of adhesively-bonded resistive electric wires, etc.

Figure 4:
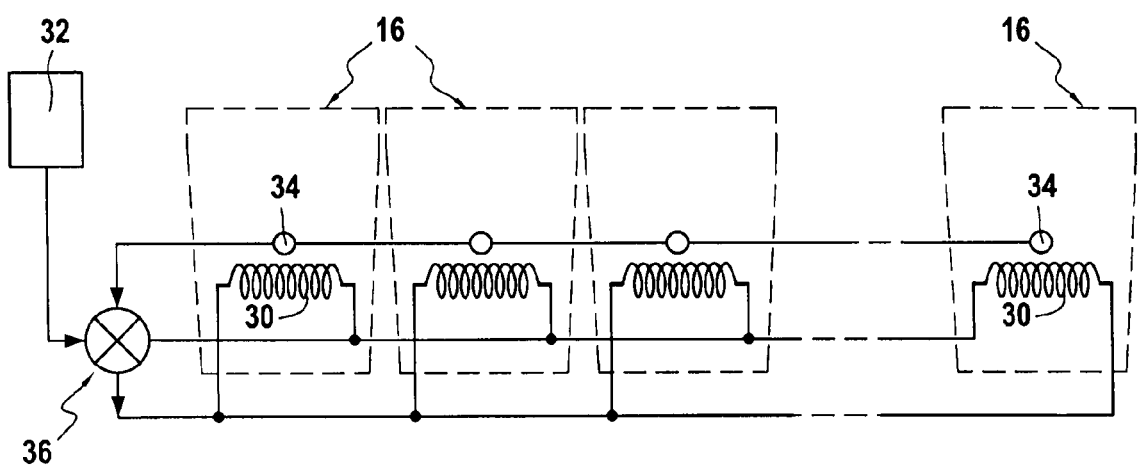
FIG. 4 is a diagram showing the controlled electric heater means suitable for deforming the panels.

As shown in FIG. 4, the electrical resistances 30 associated with each panel or even with each metal strip are electrically connected in parallel and connected to a power supply 32. In addition, each panel carries a movement sensor 34 enabling the bending of the panels to be evaluated. The signals issued by the sensors are used in a servo-control loop 36 to determine the amount of electric current that is injected into the resistances in order to obtain the desired amount of bending for the panels.

As shown in FIG. 3, each composite strip 25 presents a stub 35 of predetermined thickness. Together these stubs form an annular spacer defining the spacing between the inner casing 19 and the outer casing 18 of the wall of the nozzle. It should be observed that the outer aerodynamic streamlines of the nozzle are not modified. When the panels are retracted inside the annular cavity 21 they do not disturb the continuity of the internal aerodynamic streamlines.

An additional insulating layer 37 may be provided that covers the outsides of the panels 16 so as to limit outward heat losses and consequently reduce the amount of electricity consumed by the system for controlling the resistances.

What is claimed is:

1. An adjustable-section fan nozzle comprising:
   a ring of deformable panels arranged close to a trailing edge of the adjustable-section fan nozzle,
   wherein each deformable panel comprises a dual-strip structure comprising an inner strip of thermally-insulating material together with at least one outer strip of metal, said inner and outer strips presenting different coefficients of expansion and being assembled in full flat contact one against another so that a variation in temperature induces deformation of said dual-strip structure caused by the difference between said coefficients of expansion,
   wherein controlled heater means comprise electrical resistances distributed over the surfaces of the at least one outer strip of metal and in thermal contact therewith, and
   wherein the assembled inner and outer strips cause each deformable panel to curve in a direction tending to reduce a flow section at an outlet from the nozzle when said controlled heater means are actuated.

2. A nozzle according to claim 1, wherein said thermally-insulating material is a composite material.

3. A nozzle according to claim 1, wherein each deformable panel is substantially trapezoidal in shape.

4. A nozzle according to claim 1, wherein said deformable panels are mounted in an annular space defined in a wall of said adjustable-section fan nozzle.

5. A nozzle according to claim 4, wherein said deformable panels are continuous with an inside face of said wall when said controlled heater means are not in service.

6. A bypass turbojet, including a fan nozzle according to claim 1.

7. A nozzle according to claim 1, wherein an additional insulating layer covers an outer surface of each panel.

8. A nozzle according to claim 1, wherein an outer wall of said adjustable-section fan nozzle includes an inner annular casing and an outer annular casing defining an annular cavity therebetween, and said panels are housed in said annular cavity.

9. A nozzle according to claim 8, wherein said inner strip presents a stub with a first surface which abuts said inner annular casing and a second surface which abuts said outer annular casing.

10. A nozzle according to claim 2, wherein the composite material is based on carbon.

* * * * *